(12) United States Patent
Nishide et al.

(10) Patent No.: US 9,647,269 B2
(45) Date of Patent: May 9, 2017

(54) ELECTRODE ACTIVE MATERIAL AND SECONDARY BATTERY

(75) Inventors: Hiroyuki Nishide, Tokyo (JP); Kenichi Oyaizu, Tokyo (JP); Hiroki Yakushiji, Tokyo (JP); Shigeyuki Iwasa, Tokyo (JP); Kentaro Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 14/003,699

(22) PCT Filed: Jan. 23, 2012

(86) PCT No.: PCT/JP2012/051349
§ 371 (c)(1),
(2), (4) Date: Oct. 22, 2013

(87) PCT Pub. No.: WO2012/120929
PCT Pub. Date: Sep. 13, 2012

(65) Prior Publication Data
US 2014/0038036 A1    Feb. 6, 2014

(30) Foreign Application Priority Data

Mar. 9, 2011  (JP) .................... 2011-051393

(51) Int. Cl.
*H01M 4/60* (2006.01)
*H01M 10/0525* (2010.01)

(52) U.S. Cl.
CPC .......... *H01M 4/608* (2013.01); *H01M 4/602* (2013.01); *H01M 10/0525* (2013.01); *Y02T 10/7011* (2013.01)

(58) Field of Classification Search
CPC ................................... H01M 4/608
See application file for complete search history.

(56) References Cited

U.S. PATENT DOCUMENTS

| 4,442,187 A | 4/1984 | MacDiarmid et al. |
| 4,833,048 A | 5/1989 | Dejonghe et al. |

(Continued)

FOREIGN PATENT DOCUMENTS

| JP | 2715778 | 11/1997 |
| JP | 2002-151084 | 5/2002 |

(Continued)

OTHER PUBLICATIONS

Machine translation of FOR doc. JP 2009245921.*
International Search Report of PCT/JP2012/051349 mailed Apr. 17, 2012.

*Primary Examiner* — Ula C Ruddock
*Assistant Examiner* — Gregory Passa
(74) *Attorney, Agent, or Firm* — Wilmer Cutler Pickering Hale and Dorr LLP

(57) ABSTRACT

In a secondary battery utilizing redox by a radical site, charge-discharge is carried out in such a manner that a lithium ion moves between a positive electrode and a negative electrode (rocking chair-type). An anion in an amount necessary for electrode doping during charge-discharge is made unnecessary, thereby reducing the amount of an electrolytic solution. A secondary battery with a large energy density is achieved. Provided is an electrode active material including at least one polymer including a radical site capable of being converted into a first cation, and an anion site capable of being bonded with the first cation or a second cation.

7 Claims, 1 Drawing Sheet

(56) References Cited

U.S. PATENT DOCUMENTS

2004/0115529 A1    6/2004   Nakahara et al.
2010/0249350 A1    9/2010   Koga et al.

FOREIGN PATENT DOCUMENTS

| | | |
|---|---|---|
| JP | 2002-304996 | 10/2002 |
| JP | 2005-094776 | 4/2005 |
| JP | 3687736 | 6/2005 |
| JP | 2008-059206 | 3/2008 |
| JP | 2008-192129 | 8/2008 |
| JP | 2008-235249 | 10/2008 |
| JP | 2008-244263 | 10/2008 |
| JP | 2008-280400 | 11/2008 |
| JP | 2009-077429 | 4/2009 |
| JP | 2009-238612 | 10/2009 |
| JP | 2009-245921 | 10/2009 |
| JP | 2009245921 A * | 10/2009 |
| JP | 2010-033265 | 2/2010 |
| JP | 2010-198765 | 9/2010 |
| WO | WO 2009/054455 A1 | 4/2009 |

\* cited by examiner

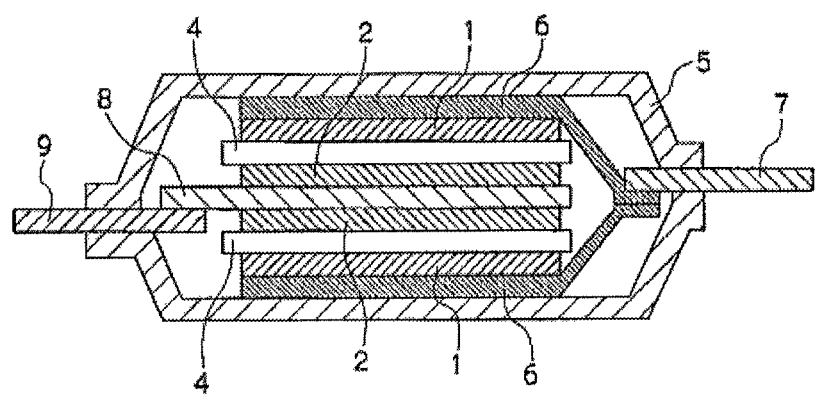

ELECTRODE ACTIVE MATERIAL AND SECONDARY BATTERY

CROSS-REFERENCE TO RELATED APPLICATIONS

This application is a national stage application of International Application No. PCT/JP2012/051349, entitled "Electrode Active Material and Secondary Battery," filed on Jan. 23, 2012, which claims the benefit of the priority of Japanese patent application No. 2011-051393, filed on Mar. 9, 2011, the disclosures of each of which are hereby incorporated by reference in their entirety.

TECHNICAL FIELD

The present invention relates to an electrode active material and a secondary battery.

BACKGROUND ART

With recent development of communication systems, mobile electronic devices such as notebook computers and mobile phones have been rapidly spread. While mobile electronic devices are advanced in terms of high functionality, they are also advanced in terms of diversification of function and shape. Then, secondary batteries serving as power sources therefor have been increasingly demanded for compact size, lightweight, high energy density, and the like.

For the purpose of obtaining a secondary battery with lightweight and a large energy density, a secondary battery in which a sulfur compound and an organic compound are used for an electrode active material has been developed. Patent Literatures 1 (U.S. Pat. No. 4,833,048) and 2 (JP2715778B) disclose a secondary battery in which an organic compound with a disulfide bond is used for a positive electrode. In such a secondary battery, an electrochemical redox reaction along with formation and dissociation of a disulfide bond is utilized. The secondary battery described in Patent Literatures 1 and 2 is constructed of an electrode material including an element with a low specific gravity, such as sulfur or carbon, as a main component, and exerts a certain effect in terms of a secondary battery with a high energy density.

However, the secondary batteries in Patent Literatures 1 and 2 could not sometimes perform a stable charge-discharge cycle because the dissociated disulfide bond is allowed to be again bonded at a low efficiency and active materials in electrodes are diffused in an electrolytic solution. Thus, in some cases, there has been a disadvantage in that a charge-discharge cycle is repeated to result in the reduction in capacity with ease.

As a secondary battery utilizing an organic compound, a secondary battery using a conductive polymer for an electrode material has also been proposed. In this secondary battery, the doping and dedoping reaction of a conductive polymer with an electrolytic ion is utilized. The doping reaction refers to a reaction for stabilizing a charged radical generated by oxidization or reduction of the conductive polymer by a counter ion.

Patent Literature 3 (U.S. Pat. No. 4,442,187) discloses a secondary battery in which such a conductive polymer is used for a positive electrode or negative electrode material. The secondary battery in Patent Literature 3 is constructed of only an element with a low specific gravity, such as carbon or nitrogen, and has been expected as a secondary battery with a high capacity.

However, the conductive polymer has such characteristics that a charged radical generated by redox is delocalized over a wide range of a π electron conjugated system, and interacts with other charged radical to cause electrostatic repulsion or radical dissipation. This allows the charged radical generated, namely, the doping concentration to be limited, and restricts the capacity of the secondary battery. For example, it has been reported that the doping rate of a secondary battery in which polyaniline is used for a positive electrode is 50% or less, and the doping rate in the case of polyacetylene is 7%. Although the secondary battery in which the conductive polymer is used for an electrode material exerts a certain effect in terms of weight saving, a secondary battery with a large energy density has not been obtained.

On the other hand, as a secondary battery in which an organic compound is used for an electrode active material, one has been proposed in which the redox reaction of a radical compound is used. This secondary battery is referred to as an organic radical battery. Patent Literature 4 (JP2002-151084A) discloses an organic radical compound, such as a nitroxyl radical compound, an aryloxy radical compound, and a polymer with a particular aminotriazine structure, as an electrode active material, and a secondary battery using the organic radical compound as a positive electrode or negative electrode material.

Patent Literature 5 (JP2002-304996A) discloses a secondary battery using in particular a compound with a cyclic nitroxyl structure, among nitroxyl compounds, as an electrode active material. The cyclic nitroxyl structure is known to exhibit stable p-type redox. As a polyradical compound for use as an electrode active material, a nitroxyl radical compound such as poly(2,2,6,6-tetramethylpiperidine-1-oxyl methacrylate) (PTMA) including 2,2,6,6-tetramethyl-piperidine-1-oxyl (TEMPO) is known.

Patent Literature 6 (JP2008-280400A) discloses a secondary battery using a stable aryloxy radical compound as an electrode active material. This compound is known to exhibit n-type redox.

CITATION LIST

Patent Literatures

Patent Literature 1: U.S. Pat. No. 4,833,048
Patent Literature 2: JP2715778B
Patent Literature 3: U.S. Pat. No. 4,442,187
Patent Literature 4: JP2002-151084A
Patent Literature 5: JP2002-304996A
Patent Literature 6: JP2008-280400A

SUMMARY OF INVENTION

Technical Problem to be Solved by Invention

In the organic radical battery, as for redox form of a radical compound being an electrode active material, there are two types of a p-type redox reaction to be carried out between a neutral radical and a cation, and an n-type redox reaction to be carried out between a neutral radical and an anion. In the case where a radical compound exhibiting n-type redox is used to prepare a secondary battery, such a case corresponds to a type where a lithium ion moves between a positive electrode and a negative electrode along with a charge-discharge reaction (so-called, rocking chair-type). In this case, the concentration of an electrolytic solution is constant regardless of the depth of charge-discharge, and the electrolytic solution may be, in theory, present in such an amount as to fill the space between electrodes. On the other hand, in the case of a secondary battery using a radical compound exhibiting p-type redox, the radical compound is doped with an anion being an electrolyte salt as charge progresses, resulting in the reduction in the anion concentration in the electrolytic solution. On the contrary, during discharge, the radical compound is dedoped to thereby result in the increase in the anion concentration in the electrolytic solution. Therefore, in the case of p-type redox, it has been necessary to store an anion serving as a dopant in the electrolytic solution, and the electrolytic solution has been required in a large amount. As a result of this, even if redox is carried out at a high doping rate, the weight of a battery has been heavier and the energy density thereof has been lower because the electrolytic solution is used in a large amount.

While the nitroxyl radical compound typified by TEMPO allows p-type redox to be reversibly repeated in a non-aqueous electrolytic solution, it does not allow n-type redox to be reversibly repeated because n-type redox is unstable due to a decomposition reaction accompanied therewith. Then, in the case where the nitroxyl radical compound is used as an electrode active material, p-type redox is utilized as an electrode reaction, and thus an anion has been required to be kept in the electrolytic solution in an amount necessary for doping. Therefore, the electrolytic solution has been required in a larger amount than the case where the electrode active material for carrying out n-type redox is used. Such an electrolytic solution in a large amount allows the total weight of a secondary battery to increase, thereby causing the decrease in energy density.

The present inventors have made intensive studies, and as a result, has found an electrode active material that can allow a lithium ion to move between a positive electrode and a negative electrode in a charge-discharge reaction even if a polymer including a radical structure for carrying out p-type redox is used.

Means for Solving Problem

One embodiment relates to an electrode active material comprising:
at least one polymer including a radical site capable of being converted into a first cation site and an anion site capable of being bonded with the first cation site or a second cation.

Another embodiment relates to an electrode active material comprising (1) polymer or (2) polymer below:
(1) a polymer including a site capable of being converted into a first cation site by an oxidization reaction and converted into a radical site by a reduction reaction and an anion site capable of being bonded with the first cation site or a second cation in a same molecule,
(2) a first polymer including a site capable of being converted into a first cation site by an oxidization reaction and converted into a radical site by a reduction reaction and a second polymer including an anion site capable of being bonded with the first cation site or a second cation.

Advantageous Effects of Invention

In a secondary battery utilizing a radical as an active material, charge-discharge can be carried out in such a manner that a lithium ion moves between a positive electrode and a negative electrode (rocking chair-type). This makes it not necessary to retain an anion in an electrolytic solution in an amount necessary for doping a radical, thereby making it possible to reduce the amount of an electrolytic solution. Consequently, a secondary battery with a large energy density can be achieved.

BRIEF DESCRIPTION OF DRAWING

FIG. 1 is a view illustrating one exemplary embodiment of a secondary battery of the present invention.

DESCRIPTION OF EMBODIMENTS

An electrode active material of the present invention includes at least one polymer including a radical site and an anion site. The radical site in the polymer can be present in the reduced state to be converted into a first cation site by oxidization. The anion site can be bonded with the first cation site into which the radical site in the polymer is converted by oxidization, or a second cation present outside the polymer. That is, the first cation site is present in the polymer, and the second cation is not present in the polymer. The second cation is not particularly limited in terms of its type, but it is preferably a monovalent cation, and more preferably a lithium ion ($Li^+$). A lithium ion ($Li^+$) can be used to provide a secondary battery with a higher energy density.

The radical site and the anion site may be present in the polymer in the same molecule, or may be present in a first polymer and a second polymer, respectively, which are different from each other. The "site", in the specification and the claims, represents at least one partial structure in the polymer molecule. The electrode active material may also be used in only a positive electrode, in only a negative electrode, or in both of a positive electrode and a negative electrode.

A secondary battery in which an electrode including the electrode active material of the present invention is used can be produced to thereby perform charge-discharge in such a manner that a lithium ion moves between a positive electrode and a negative electrode (rocking chair-type), even if a structure (for example, nitroxyl radical) for performing p-type redox is used. This makes it not necessary to retain an anion in an electrolytic solution in an amount necessary for doping during charge, thereby making it possible to reduce the amount of an electrolytic solution. As a result, a secondary battery with a larger energy density can be achieved.

Hereinafter, an electrode reaction of a secondary battery in which the electrode active material is used in a positive electrode will be described by way of example. The following reaction formula (A) is a formula representing the electrode reaction in the positive electrode during charge-discharge.

[Formula 1]

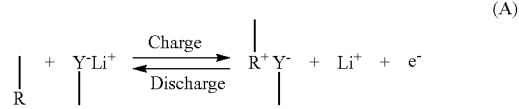

(A)

As represented by the reaction formula (A), the electrode active material includes a polymer including a radical site R. capable of being converted into a first cation site by an oxidization reaction and an anion site $Y^-$. Herein, at the left side of the reaction formula (A), a second cation with which the anion site $Y^-$ is bonded is not particularly limited in terms of its type, and a lithium ion (Li+) is represented by the reaction formula (A) as one example.

As shown in the reaction formula (A), in this secondary battery, the radical site turns into a first cation site R+ during charge and is bonded with an anion site Y− in a Y−.Li+ salt to turn into a polyion complex including a structure of R+.Y−. This allows Li+ to be released into an electrolytic solution, and to move toward a negative electrode. In addition, Li+ present in the electrolytic solution is occluded in the negative electrode in the same amount as the amount of Li+ released from the positive electrode into the electrolytic solution.

On the contrary, during discharge of the secondary battery, Li+ is released from the negative electrode into the electrolytic solution, and then moves toward the positive electrode. In addition, Li+ present in the electrolytic solution is occluded in the positive electrode in the same amount as the amount of Li+ released from the negative electrode into the electrolytic solution.

That is, this secondary battery is of such a type that Li+ moves between the positive electrode and the negative electrode along with charge-discharge (rocking chair-type). In this case, as the active material for use in the negative electrode, the electrode active material of the present invention may be used, or an active material other than the electrode active material of the present invention may be used. In the case where the electrode active material of the present invention is used for the negative electrode, the electrode reaction of the negative electrode during charge-discharge is opposite to the reaction formula (A). In addition, in the case where other active material is used for the negative electrode, it is not particularly limited as long as it can occlude Li+ during charge and release Li+ during discharge. Carbon that can occlude and release metallic lithium or a lithium ion is preferably used from the viewpoint of achieving a high voltage and a large capacity.

Although an example in which the electrode active material of the present invention is used as the active material for the positive electrode has been described in the above example, the electrode active material of the present invention may be used for only the negative electrode. In this case, the active material for use in the positive electrode is not particularly limited as long as it can release Li+ during charge and occlude Li+ during discharge.

In the case where the electrode active material of the present invention is used for the electrodes (positive electrode, negative electrode), the radical site or the first cation site and the anion site may be present in the polymer of the same molecule, or the radical site or the first cation site and the anion site may be present in respectively different polymer molecules. In the case where they are present in the polymer of the same molecule, the radical site R. and the Y−Li+ salt structure are present in one molecule, or form a polyion complex R+.Y− forming an intramolecular ionic bond in the form of R+.Y−. In the case where the radical site and the anion site are present in respectively different polymer molecules, in the positive electrode, the radical site and the anion site are present in respectively different polymer molecules in the state of discharge, but they form a polyion complex R+.Y− if charge is carried out. On the contrary, in the negative electrode, the radical site and the anion site are present in respectively different polymer molecules in the state of charge, but they form a polyion complex if discharge is carried out.

Hereinafter, the electrode active material and the secondary battery of the present invention will be described in more detail, but the present invention is not limited to the following description and can be arbitrarily modified and performed in the range not deviating from the gist of the present invention.

1. Polymer Including Radical Site

A polymer including only a radical site and not including an anion site in the same molecule is now described. This polymer includes a site capable of being converted into a radical site in the reduced state and into a first cation site in the state of oxidization. More specifically, this polymer includes a structure that is converted into a cation (R+) in the state of oxidization and a radical (R.) in the reduced state as shown in the following reaction formula (B).

[Formula 2]

(B)

As the radical site in the reduced state, a nitroxyl radical is preferably used. This nitroxyl radical turns into a nitroxyl cation represented by the following formula (1) in the state of oxidization, and turns into a nitroxyl radical represented by the following formula (2) in the reduced state, as shown in the following reaction formula (C).

[Formula 3]

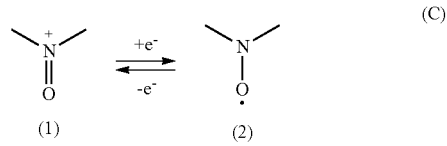

(C)

As the nitroxyl radical, one is more preferably used, which turns into a cyclic nitroxyl radical represented by the following formula (3) in the reduced state.

[Formula 4]

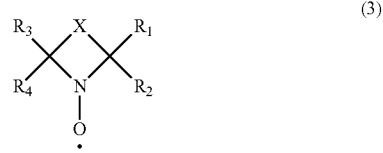

(3)

In the formula (3), each of $R_1$ to $R_4$ independently represents an alkyl group, and preferably independently represents a straight alkyl group. In addition, from the viewpoint of radical stability, each of $R_1$ to $R_4$ preferably independently represents an alkyl group with a carbon number of 1 to 4, and particularly preferably represents a methyl group. X includes such a divalent group that the cyclic nitroxyl radical in the above formula (3) forms a 5 to 7-membered ring. Such a structure of X is not particularly limited, and includes an element selected from the group consisting of carbon, oxygen, nitrogen, and sulfur. A moiety constructing the cyclic structure, of X, is not particularly limited, and specific examples thereof include —$CH_2CH_2$—, —$CH_2CH_2CH_2$—, —$CH_2CH_2CH_2CH_2$—, —CH=CH—, —CH=CHCH_2—, —CH=CHCH_2CH_2—, and —$CH_2CH$=CHCH_2—, wherein non-adjacent —CH$_2$— may be substituted with —O—, —NH— or —S—, and —CH═ may be substituted with —N═. In addition, hydrogen atoms with which atoms constructing a ring are bonded may be substituted with an alkyl group, a halogen atom, ═O, or the like.

Among them, a particularly preferable cyclic nitroxyl radical structure is selected from, in the reduced state, the group consisting of a 2,2,6,6-tetramethylpiperidinoxyl radical represented by the following formula (4), a 2,2,5,5-tetramethylpyrrolidinoxyl radical represented by the following formula (5), and a 2,2,5,5-tetramethylpyrrolinoxyl radical represented by the following formula (6). Herein, in the following formulae (4) to (6), $R_1$ to $R_4$ represent the same group as the case in the above formula (3).

[Formula 5]

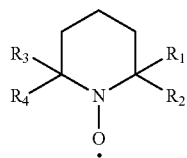

(4)

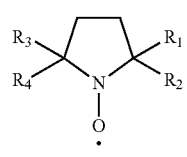

(5)

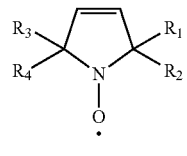

(6)

X of the cyclic nitroxyl radical structure represented by the above formula (3) is bonded with the main chain or a side chain of the polymer, and the cyclic nitroxyl radical structure constructs at least one portion of the main chain or a side chain of the polymer. That is, a structure except for at least one of hydrogen atoms with which elements constructing the cyclic structure are bonded is bonded with a side chain or the main chain of the polymer. From the viewpoint of ease of synthesis, the cyclic structure is preferably bonded with a side chain of the polymer.

When the cyclic structure is bonded with a side chain of the polymer, the cyclic structure may bond with a portion of the main chain or a side chain of the polymer through a residue X' obtained by removing a hydrogen atom from —CH$_2$—, —CH═ or —NH— constructing the cyclic structure in the group X of the cyclic nitroxyl radical structure represented by the above formula (3), as shown in the following formula (7). Herein, one portion of the main chain or a side chain of the polymer may be bonded with X' via a divalent group.

[Formula 6]

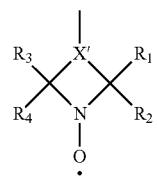

(7)

In the above formula (7), $R_1$ to $R_4$ represent the same group as the case in the above formula (3), and X' represents a residue obtained by removing hydrogen from a moiety constructing the cyclic structure of X in the above formula (3). The structure of the main chain of the polymer to be used in this time is not particularly limited, and may be any one in which the structure represented by the above formula (7) is present as a part or all of a side chain. Specific examples thereof may include one in which the structure represented by the above formula (7) is added to the polymer recited below as a side chain, or one in which one portion of atoms or groups of the polymer is substituted with the structure represented by the above formula (7) as a side chain. Even in either case, the structure represented by the above formula (7) may be bonded with the polymer indirectly or via an appropriate divalent group intermediately.

Examples of the structure of the main chain polymer can include the following:

polyalkylene-based polymers such as polyethylene, polypropylene, polybutene, polydecene, polydodecene, polyheptene, polyisobutene, and polyoctadecene;

diene-based polymers such as polybutadiene, polychloroprene, polyisoprene, and polyisobutene;

poly(meth)acrylic acid;

poly(meth)acrylonitrile;

poly(meth)acrylamide polymers such as poly(meth)acrylamide, polymethyl (meth)acrylamide, polydimethyl (meth)acrylamide, and polyisopropyl (meth)acrylamide;

polyalkyl (meth)acrylates such as polymethyl (meth)acrylate, polyethyl (meth)acrylate, and polybutyl (meth)acrylate;

fluorine-based polymers such as polyvinylidene fluoride and polytetrafluoroethylene;

polystyrene-based polymers such as polystyrene, polybromostyrene, polychlorostyrene, and polymethylstyrene;

vinyl-based polymers such as polyvinyl acetate, polyvinyl alcohol, polyvinyl chloride, polyvinyl methyl ether, polyvinyl carbazole, polyvinyl pyridine, and polyvinylpyrrolidone;

polyether-based polymers such as polyethylene oxide, polypropylene oxide, polybutene oxide, polyoxymethylene, polyacetaldehyde, polymethyl vinyl ether, polypropyl vinyl ether, polybutyl vinyl ether, and polybenzyl vinyl ether;

polysulfide-based polymers such as polymethylene sulfide, polyethylene sulfide, polyethylene disulfide, polypropylene sulfide, polyphenylene sulfide, polyethylene tetrasulfide, and polyethylene trimethylene sulfide;

polyesters such as polyethylene terephthalate, polyethylene adipate, polyethylene isophthalate, polyethylene naphthalate, polyethylene paraphenylene diacetate, and polyethylene isopropylidene dibenzoate;

polyurethanes such as poly(trimethylene ethylene urethane);

polyketone-based polymers such as polyetherketone and polyallyl ether ketone;

polyanhydride-based polymers such as polyoxyisophthaloyl;

polyamine-based polymers such as polyethylene amine, polyhexamethylene amine, and polyethylene trimethylene amine;

polyamide-based polymers such as nylon, polyglycine, and polyalanine;

polyimine-based polymers such as poly(acetyliminoethylene) and poly(benzoyliminoethylene);

polyimide-based polymers such as polyesterimide, polyetherimide, polybenzimide, and polypyrromelimide;

polyaromatic-based polymers such as polyallylene, polyallylene alkylene, polyallylene alkenylene, polyphenol, a phenolic resin, cellulose, polybenzimidazole, polybenzothiazole, polybenzoxazine, polybenzoxazole, polycarborane, polydibenzofuran, polyoxoisoindoline, polyfuran tetracarboxylic acid diimide, polyoxadiazole, polyoxindole, polyphthalazine, polyphthalide, polycyanurate, polyisocyanurate, polypiperazine, polypiperidine, polypyrazinoquinoxane, polypyrazole, polypyridazine, polypyridine, polypyromellitimine, polyquinone, polypyrrolidine, polyquinoxaline, polytriazine, and polytriazole;

siloxane-based polymers such as polydisiloxane and polydimethylsiloxane;

polysilane-based polymers;

polysilazane-based polymers;

polyphosphazene-based polymers;

polythiazyl-based polymers; and conjugated polymers such as polyacetylene, polypyrrole, and polyaniline.

Herein, the "(meth)acryl" means methacryl or acryl. Among them, the main chain polymer preferably includes a polyalkylene-based polymer, poly(meth)acrylic acid, poly(meth)acrylamide polymer, polyalkyl (meth)acrylate, or polystyrene-based polymer structure from the viewpoint of excellent electrochemical resistance. The "main chain" means the carbon chain with the largest carbon number in a polymer compound. The "side chain" means a carbon chain branched from the main chain, with a smaller carbon number than the main chain in a polymer compound. Among them, the polymer is preferably selected so that it can include a repeating unit represented by the following formula (8) in the reduced state.

[Formula 7]

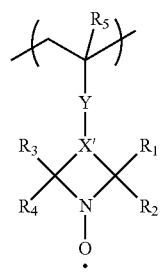

(8)

Herein, in the above formula (8), $R_1$ to $R_4$ each represent the same group as $R_1$ to $R_4$ in the above formula (3), and X' represents the same as X' in the above formula (7). $R_5$ represents hydrogen or a methyl group. Y may include, but not limited to, —CO—, —COO—, —CONR$_6$—, —O—, —S—, an alkylene group with a carbon number of 1 to 18, optionally including a substituent group, an arylene group with a carbon number of 1 to 18, optionally including a substituent group, and a divalent group in which two or more groups thereof are bonded therewith. $R_6$ represents an alkyl group with a carbon number of 1 to 18. Units represented by the following formulae (9) to (11) are particularly preferable among the units represented by the above formula (8).

[Formula 8]

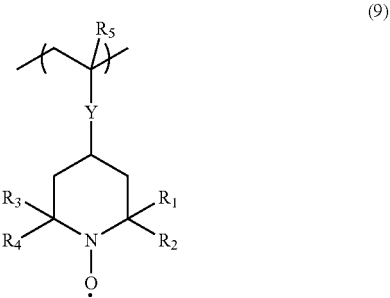

(9)

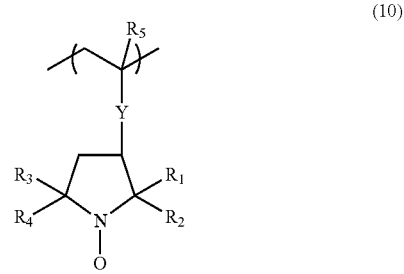

(10)

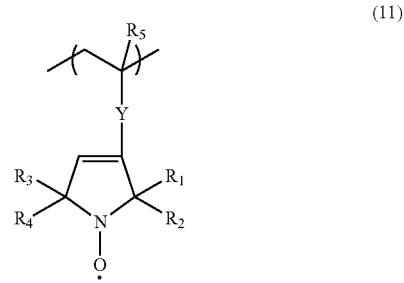

(11)

In the above formulae (9) to (11), $R_1$ to $R_4$ each represent the same group as $R_1$ to $R_4$ in the above formula (3), and $R_5$ and Y each represent the same group as $R_5$ and Y in the above formula (8), but Y is particularly preferably any of —COO—, —O— and —CONR$_6$—. $R_6$ represents the same group as $R_6$ in the above formula (8).

The structure represented by the above formula (7) may construct a part of the main chain or a side chain of the polymer, or may construct all of the main chain or a side chain thereof. For example, all the units constructing the polymer may be the units represented by the above formula (8), or a part thereof may be the units represented by the above formula (8). The content of the cyclic nitroxyl radical site in the polymer changes depending on the purpose, the structure of the polymer, and the production method, but the cyclic nitroxyl radical site needs to be present even in a slight proportion. The content of the cyclic nitroxyl radical site is usually 1% by mass or more, and particularly preferably 10% by mass or more of the entire polymer. The method for synthesizing the polymer is not particularly limited, and the content of the cyclic nitroxyl radical site in the polymer is 50% by mass or more, and particularly preferably 80% by mass or more in the case where an electric storage effect is intended to be achieved as large as possible.

Preferable examples of the polymer unit including a radical site can include structures represented by the following formula (12) and/or (13), or a copolymer including the chemical structures thereof as repeating units. Herein, in the following formulae (12) and (13), $R_1$ to $R_4$ each represent the same group as $R_1$ to $R_4$ in the above formula (3), and $R_5$ represents hydrogen or a methyl group.

[Formula 9]

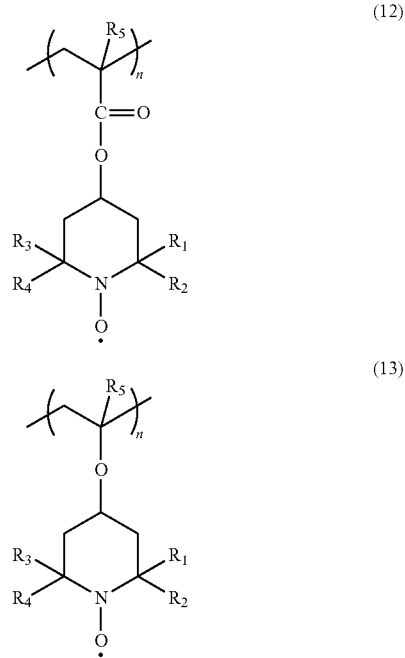

(in the above formulae (12) and (13), n represents an arbitrary positive integer).

The molecular weight of the polymer including a radical site is not particularly limited, but is preferably such a molecular weight that when the polymer constructs a secondary battery, it is not dissolved in the electrolytic solution. The molecular weight of the polymer changes depending on the combination polymer and type of organic solvent in the electrolytic solution. The weight average molecular weight is generally 1000 or more, preferably 10000 or more, and more preferably 20000 or more. In addition, it is preferably 5000000 or less, and more preferably 500000 or less. The polymer including the structure represented by the above formula (7) may be crosslinked, thereby making it possible to enhance the durability against the electrolyte.

2. Polymer Including Anion Site

A polymer including only an anion site and not including a radical site in the same molecule is now described. As the anion site, an anion selected from sulfonate, carboxylat and phosphate can be used. Examples of the structure of the main chain of the polymer including the anion site can include the following:
polyalkylene-based polymers such as polyethylene, polypropylene, polybutene, polydecene, polydodecene, polyheptene, polyisobutene and polyoctadecene;
diene-based polymers such as polybutadiene, polychloroprene, polyisoprene, and polyisobutene;
poly(meth)acrylic acid;
poly(meth)acrylonitrile;
poly(meth)acrylamide polymers such as poly(meth)acrylamide, polymethyl (meth)acrylamide, polydimethyl (meth)acrylamide, and polyisopropyl (meth)acrylamide;
polyalkyl (meth)acrylates such as polymethyl (meth)acrylate, polyethyl (meth)acrylate, and polybutyl (meth)acrylate;
fluorine-based polymers such as polyvinylidene fluoride and polytetrafluoroethylene;
polystyrene-based polymers such as polystyrene, polybromostyrene, polychlorostyrene, and polymethylstyrene;
vinyl-based polymers such as polyvinyl acetate, polyvinyl alcohol, polyvinyl chloride, polyvinyl methyl ether, polyvinyl carbazole, polyvinyl pyridine, and polyvinylpyrrolidone;
polyether-based polymers such as polyethylene oxide, polypropylene oxide, polybutene oxide, polyoxymethylene, polyacetaldehyde, polymethyl vinyl ether, polypropyl vinyl ether, polybutyl vinyl ether, and polybenzyl vinyl ether;
polysulfide-based polymers such as polymethylene sulfide, polyethylene sulfide, polyethylene disulfide, polypropylene sulfide, polyphenylene sulfide, polyethylene tetrasulfide, and polyethylene trimethylene sulfide;
polyesters such as polyethylene terephthalate, polyethylene adipate, polyethylene isophthalate, polyethylene naphthalate, polyethylene paraphenylene diacetate, and polyethylene isopropylidene dibenzoate;
polyurethanes such as poly(trimethylene ethylene urethane);
polyketone-based polymers such as polyetherketone and polyallyl ether ketone;
polyanhydride-based polymers such as polyoxyisophthaloyl;
polyamine-based polymers such as polyethylene amine, polyhexamethylene amine, and polyethylene trimethylene amine;
polyamide-based polymers such as nylon, polyglycine, and polyalanine;
polyimine-based polymers such as poly(acetyliminoethylene) and poly(benzoyliminoethylene);
polyimide-based polymers such as polyesterimide, polyetherimide, polybenzimide, and polypyrromelimide;
polyaromatic-based polymers such as polyallylene, polyallylene alkylene, polyallylene alkenylene, polyphenol, a phenolic resin, cellulose, polybenzimidazole, polybenzothiazole, polybenzoxazine, polybenzoxazole, polycarborane, polydibenzofuran, polyoxoisoindoline, polyfuran tetracarboxylic diimide, polyoxadiazole, polyoxindole, polyphthalazine, polyphthalide, polycyanurate, polyisocyanurate, polypiperazine, polypiperidine, polypyrazinoquinoxane, polypyrazole, polypyridazine, polypyridine, polypyromellitimine, polyquinone, polypyrrolidine, polyquinoxaline, polytriazine, and polytriazole;
siloxane-based polymers such as polydisiloxane and polydimethylsiloxane;
polysilane-based polymers;
polysilazane-based polymers;
polyphosphazene-based polymers;
polythiazyl-based polymers; and
conjugated polymers such as polyacetylene, polypyrrole, and polyaniline.

Herein, the "(meth)acryl" means methacryl or acryl. Among them, the polymer preferably includes a polyalkylene-based polymer, poly(meth)acrylic acid, poly(meth)acrylamide polymer, polyalkyl (meth)acrylate, or polystyrene-based polymer structure as the main chain structure from the viewpoint of excellent electrochemical resistance. The "main chain" means the carbon chain with the largest carbon number in a polymer compound.

Hereinafter, examples of the polymer including the anion site preferably used in the present invention can include polymers represented by the following formulae (14) and (15).

[Formula 10]

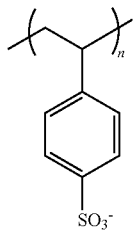
(14)

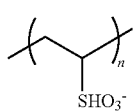
(15)

(in the above formulae (14) and (15), n represents an arbitrary positive integer).

3. Polymer Including Radical Site and Anion Site in Same Molecule

A polymer including a radical site and an anion site in the same molecule is now described. One example of this polymer is represented by the following formula (16).

[Formula 11]

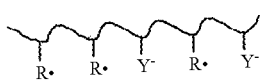
(16)

Examples of this polymer can include polymers represented by the following formulae (17), (18), (19), and (20).

[Formula 12]

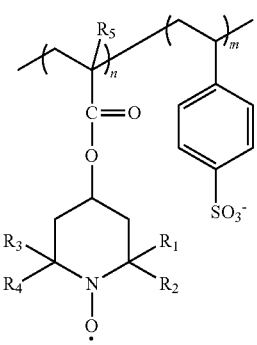
(17)

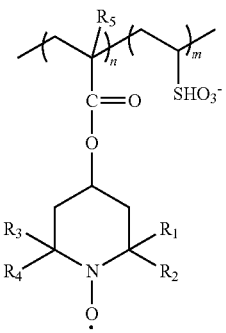
(18)

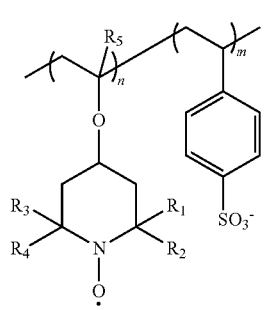
(19)

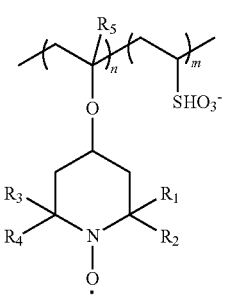
(20)

(in the above formulae (17) to (20), n and m each represent an arbitrary positive integer).

In the above formulae (17) to (20), $R_1$ to $R_4$ each represent the same group as $R_1$ to $R_4$ in the above formula (3), and $R_5$ represents the same group as $R_5$ in the above formula (8).

Herein, in the above formulae (16) to (20), the radical site may optionally serve as a first cation site.

4. Polyion Complex

A polyion complex can be obtained by oxidizing a radical site R. to convert it into a first cation site $R^+$, and further allowing it to be bonded with an anion site $Y^-$ to turn into $R^+ \cdot Y^-$, as shown in the following formula (21).

[Formula 13]

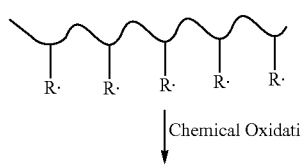
(21)

↓ Chemical Oxidation

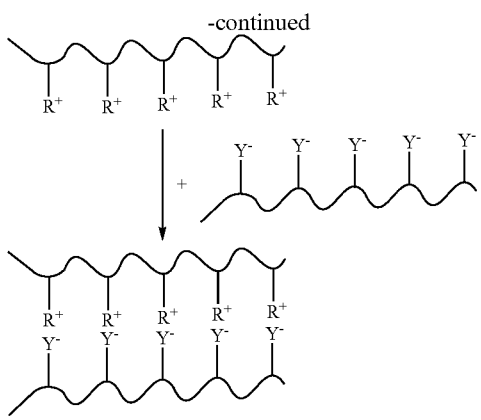

If a radical site and an anion site are present in the same molecule, the polymer described in the above "3. Polymer Including Radical Site and Anion Site in Same Molecule" can be used as the polymer including a radical site and an anion site. If a radical site and an anion site are present in respectively different polymer molecules, the polymer described in the above "1. Polymer Including Radical Site" and the polymer described in the above "2. Polymer Including Anion Site" can be used as the polymer including a radical site and the polymer including an anion site, respectively.

5. Secondary Battery

FIG. 1 illustrates one exemplary embodiment of the secondary battery of the present invention. The secondary battery illustrated in FIG. 1 includes a laminate obtained by stacking a positive electrode 1 formed on a current collector (metal foil) 4 connected to a positive electrode lead 5 and a negative electrode 2 formed on a current collector (metal foil) 6 connected to a negative electrode lead 7 so that the electrodes are oppositely arranged via a separator 3 including an electrolyte. This laminate is sealed by an aluminum laminate outer package (film for outer package) 8. In the case where a solid electrolyte or a gel electrolyte is used as the electrolyte, a form in which such an electrolyte is interposed between the electrodes instead of the separator 3 may be adopted.

The shape of the secondary battery used in the exemplary embodiment in FIG. 1 is one where the laminate is accommodated within the outer package 8, but is not limited thereto, and a conventionally known shape can be used. Examples of the shape of the secondary battery include one where a laminated and wound electrode body is sealed by a metallic casing, a resin casing, or a laminating film made of a metal foil such as an aluminum foil and a synthetic resin film, and the secondary battery is manufactured in the form of cylinder, square, coin, or sheet. In addition, the electrode active material of the present invention is used for the positive electrode 1, the negative electrode 2, or both thereof.

Herein, the "secondary battery" means one in which an energy electrochemically stored can be taken out in the form of power and charge-discharge can be performed. In the secondary battery, the "positive electrode" refers to an electrode with a higher redox potential, and on the contrary, the "negative electrode" refers to an electrode with a lower redox potential. The secondary battery of the present invention is optionally referred to as the "capacitor." Then, the respective components of the secondary battery are described.

(1) Electrode Active Material

The electrode active material of the present invention can be used in any one or both of the positive electrode and the negative electrode of the secondary battery. The electrode active material of the present invention may be used alone or may be combined with other active material in the electrodes (positive electrode, negative electrode) of the secondary battery. In the case where the electrode active material of the present invention and other active material are used in combination, the electrode active material of the present invention is preferably included in an amount of 10 to 90 parts by mass, and more preferably in an amount of 20 to 80 parts by mass, with respect to 100 parts by mass of the total of the active materials. In this case, the below described active material for positive and negative electrodes can be used in combination as other active material.

In the case where the electrode active material of the present invention is used for only one of the positive electrode or the negative electrode, a conventionally known active material can be utilized as the active material for the other electrode not including the electrode active material of the present invention.

For example, in the case where the electrode active material of the present invention is used for the positive electrode, a material that is capable of reversibly occluding and releasing a lithium ion can be used as the active material for the negative electrode. Examples of the active material for the negative electrode can include metallic lithium, a lithium alloy, carbon materials, conductive polymers, and lithium oxides. Examples of the lithium alloy include a lithium-aluminum alloy, a lithium-tin alloy, and a lithium-silicon alloy. Examples of the carbon materials include graphite, hard carbon, and activated carbon. Examples of the conductive polymers can include polyacene, polyacetylene, polyphenylene, polyaniline, and polypyrrole. Examples of the lithium oxides can include lithium alloys such as a lithium aluminum alloy, and lithium titanate.

In addition, in the case where the electrode active material of the present invention is used for the negative electrode, a material that is capable of reversibly occluding and releasing a lithium ion can be used as the active material for the positive electrode. The active material for the positive electrode can include a lithium-containing composite oxide, and specifically, $LiMO_2$ (M is selected from Mn, Fe, and Co, and a part thereof may be substituted with other cation such as Mg, Al, and Ti), $LiMn_2O_4$, an olivine-type metal phosphate material, or the like can be used therefor.

The electrode for which the electrode active material of the present invention is used is not limited to any of the positive electrode and the negative electrode, but the electrode active material of the present invention is preferably used as the active material for the positive electrode in terms of energy density.

(2) Conductivity Imparting Agent (Auxiliary Conductive Material) and Ion Conductive Auxiliary Material A conductivity imparting agent (auxiliary conductive material) or an ion conductive auxiliary material can also be admixed in the positive electrode and negative electrode for the purpose of the reduction in impedance and the improvements in energy density and output characteristics.

The conductivity imparting agent includes carbon materials such as graphite, carbon black, acetylene black, a carbon fiber and a carbon nanotube, and conductive polymers such as polyaniline, polypyrrole, polythiophene, polyacetylene, and polyacene. Among them, a carbon material is preferable, and specifically, it is preferably at least one selected from the group consisting of natural graphite, artificial graphite, carbon black, a vapor-grown carbon fiber, a mesophase pitch carbon fiber, and a carbon nanotube. Two or more of these conductivity imparting agents may be mixed at an arbitrary proportion and used within the gist of the present invention.

The size of the conductivity imparting agent is not particularly limited, but is preferably small as much as possible from the viewpoint of uniform dispersion. For example, the particle diameter thereof is preferably 500 nm or less as the average particle diameter of primary particles, and in the case where the conductivity imparting agent is a fiber- or tube-shaped material, the diameter thereof is preferably 500 nm or less and the length thereof is preferably 5 nm or more, 50 μm or less. Herein, the average particle diameter and the respective dimensions are the average value obtained by observation in an electron microscope, or the value measured by a $D_{50}$ value particle size distribution analyzer in the particle size distribution measured by a laser diffraction particle size distribution measurement apparatus.

The ion conductive auxiliary material includes a polymer gel electrolyte and a polymer solid electrolyte. Among these, a carbon fiber is preferably mixed. A carbon fiber is mixed to further increase the tension strength of the electrode, thereby preventing the electrode from being cracked or peeled off. A vapor-grown carbon fiber is more preferably mixed. These materials may be used alone, or two or more thereof may be mixed and used. The proportion of these materials in the electrode is preferably 10 to 80% by mass.

(3) Binder

A binder may also be used in order to strengthen binding between the respective materials in the positive electrode and the negative electrode. Such a binder includes resin binders such as polytetrafluoroethylene, polyvinylidene fluoride, a vinylidene fluoride-hexafluoropropylene copolymer, a vinylidene fluoride-tetrafluoroethylene copolymer, a styrene-butadiene copolymer rubber, polypropylene, polyethylene, polyimide, and various polyurethanes. These binders can be used alone, or two or more thereof may also be mixed and used. The proportion of the binder in the electrode is preferably 5 to 30% by mass.

(4) Thickener

A thickener may also be used in order to facilitate the adjustment of a slurry for electrodes. Such a thickener includes carboxymethyl cellulose, polyethylene oxide, polypropylene oxide, hydroxyethyl cellulose, hydroxypropyl cellulose, carboxymethyl hydroxyethyl cellulose, polyvinyl alcohol, polyacrylamide, poly(hydroxyethyl acrylate), poly (ammonium acrylate), and polyacrylic acid soda or the like. These thickeners may be used alone, or two or more thereof may also be mixed and used. The proportion of the thickener in the electrode is preferably 0.1 to 5% by mass. In addition, the thickener serves as a binder in some cases.

(5) Current Collector

As a negative electrode current collector and a positive electrode current collector, a foil made of nickel, aluminum, copper, gold, silver, an aluminum alloy, stainless, carbon, or the like, a metal plate, or a mesh-shaped one can be used. In addition, a catalytic effect may be imparted to the current collector, or the electrode active material and the current collector may be chemically bonded with each other.

(6) Separator

As a separator, a porous film made of polyethylene, polypropylene, or the like, a cellulose membrane, a non-woven fabric, or the like can also be used. In the case where a solid electrolyte or a gel electrolyte is used as an electrolyte, such an electrolyte can also be interposed between the positive electrode and the negative electrode, instead of the separator.

(7) Electrolyte

An electrolyte is one for performing the transporting of a charged carrier between the negative electrode and the positive electrode, and it is generally preferably that the electrolyte has the ion conductivity of $10^{-5}$ to $10^{-1}$ S/cm at 20° C. For example, an electrolytic solution in which an electrolyte salt is dissolved in a solvent can be utilized as the electrolyte. In the case where the second cation is a lithium ion, a conventionally known material such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, and $Li(C_2F_5SO_2)_3C$ can be used as the electrolyte salt. These electrolyte salts may be used alone, or two or more thereof may also be mixed and used.

In addition, in the case where a solvent is used in the electrolytic solution, it is possible to use an organic solvent such as ethylene carbonate, propylene carbonate, dimethyl carbonate, diethyl carbonate, methyl ethyl carbonate, γ-butyrolactone, tetrahydrofuran, dioxolane, sulfolane, N,N-dimethylformamide, N,N-dimethylacetamide, and N-methyl-2-pyrrolidone, as the solvent. These solvents may be used alone, or two or more thereof may also be mixed and used.

Furthermore, a solid electrolyte may also be used as the electrolyte. A polymer compound for use in such a solid electrolyte can include the following:
vinylidene fluoride-based polymers such as polyvinylidene fluoride, a vinylidene fluoride-hexafluoropropylene copolymer, a vinylidene fluoride-ethylene copolymer, a vinylidene fluoride-monofluoroethylene copolymer, a vinylidene fluoride-trifluoroethylene copolymer, a vinylidene fluoride-tetrafluoroethylene copolymer, and a vinylidene fluoride-hexafluoropropylene-tetrafluoroethylene terpolymer;
acrylonitrile-based polymers such as an acrylonitrile-methyl methacrylate copolymer, an acrylonitrile-methyl acrylate copolymer, an acrylonitrile-ethyl methacrylate copolymer, an acrylonitrile-ethyl acrylate copolymer, an acrylonitrile-methacrylic acid copolymer, an acrylonitrile-acrylic acid copolymer, and an acrylonitrile-vinyl acetate copolymer; and
polyethylene oxide, an ethylene oxide-propylene oxide copolymer, and acrylate or methacrylate polymers thereof.

Such a polymer compound in the form of gel, in which the electrolytic solution is immersed, may be used, or only such a polymer compound in which the electrolyte salt is contained may be used as it is.

(8) Shape of Secondary Battery

The shape of the secondary battery is not particularly limited, and a conventionally known one may be used. The shape of the secondary battery includes one where a laminated or wound electrode body is sealed by a metallic casing, a resin casing, or a laminating film made of a metal foil such as an aluminum foil and a synthetic resin film. Specifically, the secondary battery is prepared in the form of cylinder, square, coin, sheet, and the like, but the shape of the secondary battery of the present invention is not limited thereto.

(9) Method of Manufacturing Secondary Battery

The method of manufacturing the secondary battery is not particularly limited, and a method appropriately selected depending on the material can be used. Examples thereof can include the following method: A solvent is added to an electrode active material, a conductivity imparting agent, and the like to form a slurry, the slurry is applied on a current collector, and then heated or subjected to volatilization of the solvent at normal temperature to thereby provide electrodes.

Thereafter, the electrodes are laminated or wound while sandwiching the separator and being opposite to each other, then surrounded by the outer package, injected with the electrolytic solution, and sealed.

The solvent for forming a slurry can include the following:
ether-based solvents such as tetrahydrofuran, diethyl ether, ethylene glycol dimethyl ether, and dioxane;
amine-based solvents such as N,N-dimethylformamide and N-methylpyrrolidone;
aromatic hydrocarbon-based solvents such as benzene, toluene, and xylene;
aliphatic hydrocarbon-based solvents such as hexane and heptane;
halogenated hydrocarbon-based solvents such as chloroform, dichloromethane, dichloroethane, trichloroethane, and carbon tetrachloride;
alkyl ketone-based solvents such as acetone and methyl ethyl ketone;
alcohol-based solvents such as methanol, ethanol, and isopropyl alcohol; and
dimethyl sulfoxide, and water.

The method of preparing an electrode can include a method in which an electrode active material, a conductivity imparting agent, and the like are kneaded in a dry manner, then formed into a thin film, and laminated on a current collector, in addition to the methods recited above. In the case where the method in which a slurry is applied on a current collector, and then subjected to volatilization of the solvent is used as the method of preparing an electrode, an electrode is preferably prepared at a thickness of 40 μm or more and 300 μm or less to thereby prevent the electrode from being peeled off or cracked. As a result of this, a uniform electrode can be prepared.

When an electrode is manufactured, a polymer in the form of radical site may be used, or a polymer in the form that is capable of being changed to a radical by an electrode reaction may be used, as an electrode active material. In the case where the polymer in the form of radical site is used, the radical site of the polymer can be converted into a first cation site by an electrode reaction (oxidization reaction). In the case where the polymer with a site capable of being changed into a radical is used, the polymer includes a first cation site, and can be converted into a radical site by an electrode reaction (reduction reaction). Examples of the polymer can include the salt of the polymer including the first cation site and $PF^{6-}$, $BF^{4-}$ or the like In the method of manufacturing the secondary battery, conventionally known conditions can be used as other manufacturing conditions such as drawing of lead from electrodes, and outer packaging.

As described above, in one example of the secondary battery of the present invention, a composite of the electrode active material of the present invention, activated carbon and conductive material, or a mixture of a composite of the electrode active material of the present invention and conductive material with activated carbon, exerting a good electron conductivity, is used for an electrode. This makes it possible to increase the discharge capacity of the secondary battery, thereby allowing a large current to flow at a level of several seconds.

EXAMPLES

Hereinafter, the present invention will be described in more detail with reference to Examples, but the present invention is not limited to these Examples.

Example 1

In the present Example, a secondary battery in which a polyion complex A represented by the following formula (22) was used for a positive active material was prepared.

[Formula 14]

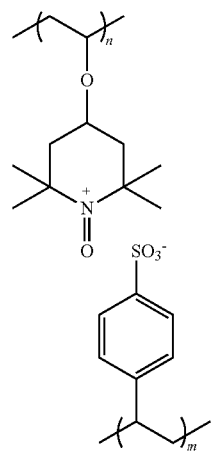

(22)

Specifically, a cyclic nitroxyl radical polymer (Mn=8.0× $10^4$) represented by the following formula (23) was oxidized by $HPF_6$ and NaClO to be converted into a cation polymer including a first represented by the following formula (24).

[Formula 15]

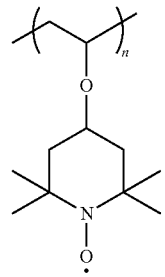

(23)

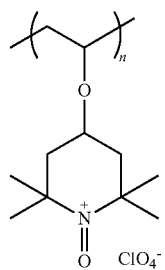

(24)

One equivalent of this cation polymer and of polystyrene sulfonic acid PSS (Mw=7.5×$10^4$) were dissolved in a mixed solvent of acetone:water=3:1 (v/v), respectively, thereby providing a PSS solution. The PSS solution was dropwise added to the cation polymer and stirred, thereby providing the polyion complex A represented by the above formula

(22) as a white precipitate (yield: 91%). The remaining radical concentration is measured by the SQUID measurement (Superconducting Quantum Interference Devic; superconducting quantum interference device), and it was calculated to be 30%.

The polyion complex A, a carbon fiber, and polyvinylidene difluoride were mixed in a mass ratio of 1/8/1, and then dispersed in N-methylpyrrolidone, thereby providing a slurry. The slurry was applied on an aluminum foil to thereby prepare a polyion complex A/carbon composite electrode. A half cell, in which the obtained polyion complex A/carbon composite electrode was used for the positive electrode, metallic Li was used for the negative electrode, and 0.5 M $(C_4H_9)_4NClO_4$-containing acetonitrile was used for the electrolytic solution, was prepared, and evaluated for discharge characteristics. As a result, a discharge capacity of 28 was achieved at a discharge of 10 C. About 30% of capacity of the theoretical capacity of 70.3 mAh/g was achieved, and the polyion complex A was confirmed to be effective as the electrode active material.

Example 2

An electrode in which a copolymer B represented by the following formula (25) was used for the electrode active material was prepared.

[Formula 16]

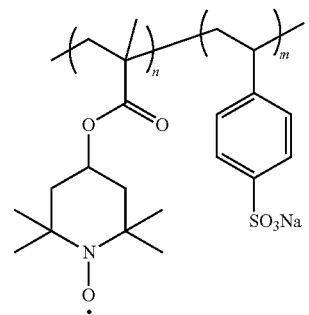

(25)

Specifically, 2,2,6,6-tetramethyl-4-piperidyl methacrylate and sodium p-styrene sulfonate charged in a ratio of 1/1 in a mixed solvent of methanol/water=2/1 (v/v) were subjected to radical polymerization with AIBN (0.25 mol %) as an initiator. Thus, the copolymer B was obtained as a white solid (Mn=$1.2 \times 10^5$).

The 2D-NMR DOSY spectrum of the white solid showed a peak derived from a methyl group (d=0.95 ppm) and a peak derived from an aromatic ring (d=7.42 ppm), the peaks showing the same diffusion coefficient, and thus the copolymer B represented by the following formula (26) was confirmed to be produced. The elemental analysis was carried out, and the copolymerization ratio was found to be m/n=4/6.

[Formula 17]

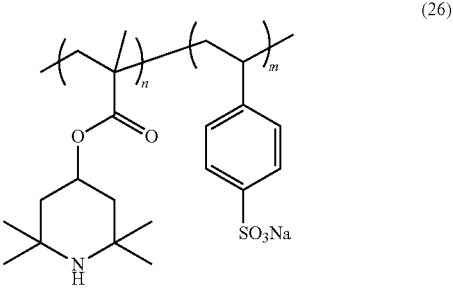

(26)

The copolymer B represented by the above formula (26) was ground by a ball mill, then added to an mCPBA–THF solution and uniformly dissolved therein, and stirred overnight. The resultant was precipitated and purified in diethyl ether, thereby providing the copolymer B as an orange solid. The radical concentration was estimated to be 96% by the SQUID measurement. The copolymer B/VGCF/PVdF mixed in a ratio of 1/8/1 (mass ratio) was applied on an ITO substrate to prepare an electrode.

The electrode was subjected to the CV measurement in an acetonitrile solution containing 0.1 M $(C_4H_9)_4NClO_4$, and the redox waves were observed at two stages of $E_{1/2}$=+0.65 V, +0.77 V (vs. Ag/AgCl). In the initial cycle, charge-discharge was confirmed to be carried out in 92% of the theoretical capacity calculated from the radical concentration. From this result, the copolymer B was confirmed to be effective as the electrode active material.

This application claims the priority based on Japanese Patent Application 2011-51393 filed on Mar. 9, 2011, whose disclosure is incorporated herein in its entirety.

INDUSTRIAL APPLICABILITY

The secondary battery of the present invention can be used for power sources for various mobile electronic devices requiring for a high energy density, driving or auxiliary storage power sources for electric vehicles, hybrid electric vehicles, and the like, power storage devices of various energies such as solar energy and wind-power generation, or storage power sources for domestic electric appliances.

EXPLANATION OF REFERENCE 1 positive electrode
2 negative electrode
3 separator
4 positive electrode current collector
5 positive electrode lead
6 negative electrode current collector
7 negative electrode lead
8 outer package
9 secondary battery

The invention claimed is:
1. An electrode active material comprising:
at least one polyion complex comprising:
a first polymer including a plurality of cation sites that are capable of being converted into radical sites by a reduction reaction, wherein at least one of the radical sites in a reduced state is a nitroxyl radical, and wherein the nitroxyl radical is a cyclic nitroxyl radical represented by formula (3) below:

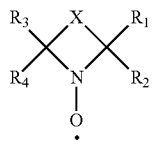

(3)

in the formula (3), each of $R_1$ to $R_4$ independently represents an alkyl group, and X includes such a divalent group that the formula (3) forms a 5 to 7-membered ring, provided that the cyclic nitroxyl radical in the formula (3) constructs at least one portion of a main chain or a side chain of the polymer); and a second polymer including a plurality of anion sites that are ionically bonded to the respective cation sites of the first polymer, wherein at least one of the plurality of anion sites is at least one anion selected from a group consisting of sulfonate, carboxylate, and phosphate.

2. An electrode active material comprising:
at least a polymer including:
a site capable of being converted into a cation site by an oxidization reaction and converted into a radical site by a reduction reaction, wherein the radical site in a reduced state is a nitroxyl radical, and wherein the nitroxyl radical is a cyclic nitroxyl radical represented by formula (3) below:

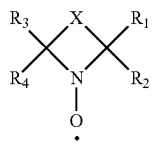

(3)

(in the formula (3), each of $R_1$ to $R_4$ independently represents an alkyl group, and X includes such a divalent group that the formula (3) forms a 5 to 7-membered ring, provided that the cyclic nitroxyl radical in the formula (3) constructs at least one portion of a main chain or a side chain of the polymer); and an anion site capable of being bonded with the cation site in a same molecule, wherein the anion site is at least one anion selected from a group consisting of sulfonate, carboxylate, and phosphate.

3. A secondary battery comprising:
a positive electrode including the electrode active material according to claim 1 wherein the anion site is capable of being bonded with a lithium ion ($Li^+$);
a negative electrode including an active material capable of occluding and releasing the lithium ion ($Li^+$); and
a non-aqueous electrolytic solution including a lithium salt as an electrolyte, and an aprotic solvent.

4. A secondary battery comprising a positive electrode and a negative electrode in any one form of (A) to (C) below:
(A) the positive electrode including the electrode active material according to claim 1 wherein the anion site is capable of being bonded with a lithium ion ($Li^+$), and the negative electrode including an active material capable of occluding and releasing the lithium ion ($Li^+$),
(B) the positive electrode including an active material capable of occluding and releasing a lithium ion ($Li^+$), and the negative electrode including the electrode active material according to claim 1 wherein the anion site is capable of being bonded with the lithium ion ($Li^+$), and
(C) the positive electrode and the negative electrode each including the electrode active material according to claim 1 wherein the anion site is capable of being bonded with a lithium ion ($Li^+$).

5. A secondary battery comprising:
a positive electrode including the electrode active material according to claim 2 wherein the anion site is capable of being bonded with a lithium ion ($Li^+$);
a negative electrode including an active material capable of occluding and releasing the lithium ion ($Li^+$); and
a non-aqueous electrolytic solution including a lithium salt as an electrolyte, and an aprotic solvent.

6. A secondary battery comprising a positive electrode and a negative electrode in any one form of (A) to (C) below:
(A) the positive electrode including the electrode active material according to claim 2 wherein the anion site is capable of being bonded with a lithium ion ($Li^+$), and the negative electrode including an active material capable of occluding and releasing the lithium ion ($Li^+$),
(B) the positive electrode including an active material capable of occluding and releasing a lithium ion ($Li^+$), and the negative electrode including the electrode active material according to a claim 2 wherein the anion site is capable of being bonded with the lithium ion ($Li^+$), and
(C) the positive electrode and the negative electrode each including the electrode active material according to claim 2 wherein the anion site is capable of being bonded with a lithium ion ($Li^+$).

7. The electrode active material according to claim 2, wherein the cation site in an oxidation state is bonded with the anion site to form polyion complex in an initial state.

* * * * *